United States Patent [19]

Edlinger et al.

[11] Patent Number: 5,784,455
[45] Date of Patent: Jul. 21, 1998

[54] METHOD AND APPARATUS FOR ECHO COMPENSATOR CONNECTION FOR TELEPHONE CONNECTIONS

[75] Inventors: Helmut Edlinger, Neuried; Hans-Peter Mueller, Munich, both of Germany

[73] Assignee: Siemens Aktiengesellschaft, Munich, Germany

[21] Appl. No.: 641,727

[22] Filed: May 2, 1996

[30] Foreign Application Priority Data

May 12, 1995 [DE] Germany ............ 195 01 70 574.3

[51] Int. Cl.[6] ............................................. H04M 9/00
[52] U.S. Cl. .................. 379/410; 379/406; 379/219; 370/286
[58] Field of Search ...................... 379/410, 411, 379/406, 407, 408, 219, 232, 225, 3, 5, 14; 370/32.1, 110, 112, 286, 289, 260

[56] References Cited

U.S. PATENT DOCUMENTS

| | | | |
|---|---|---|---|
| 4,881,221 | 11/1989 | Schroeder et al. | 370/287 |
| 5,029,204 | 7/1991 | Shenoi et al. | 370/237 |
| 5,339,356 | 8/1994 | Ishii | 379/231 |
| 5,491,695 | 2/1996 | Meagher et al. | 370/260 |
| 5,517,563 | 5/1996 | Norell | 379/231 |
| 5,526,414 | 6/1996 | Bedard et al. | 379/225 |
| 5,530,724 | 6/1996 | Abrams et al. | 379/410 |
| 5,610,909 | 3/1997 | Shaw | 379/410 |

Primary Examiner—Krista Zele
Assistant Examiner—Jacques M. Saint-Surin
Attorney, Agent, or Firm—Hill & Simpson

[57] ABSTRACT

In a method and an apparatus for echo compensator connection for telephone connections in a telecommunication network that has a plurality of network groups (10), each network group has at least one remote node and a plurality of subscriber stations (14) that are connected to the remote node (12) via network group lines (18). The size of the network groups is selected such that echo compensation is not required given the maximum signal running times occurring within a respective network group (10). The remote nodes (12) of various network groups (10) are connected to one another by long-distance trunks (20). An echo compensator (22) is looped into the connection in the respective remote node (12) of the originating network group and of the destination network group given setup of a telephone connection between two network groups.

8 Claims, 3 Drawing Sheets

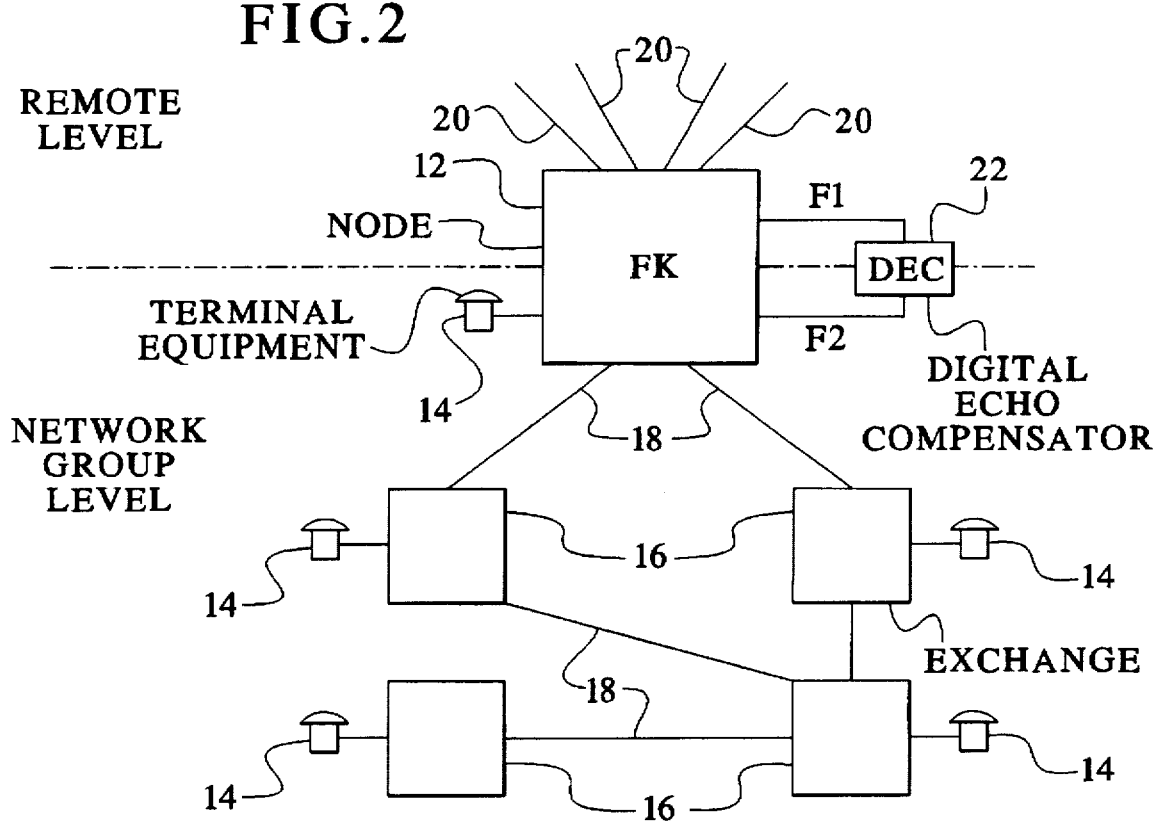
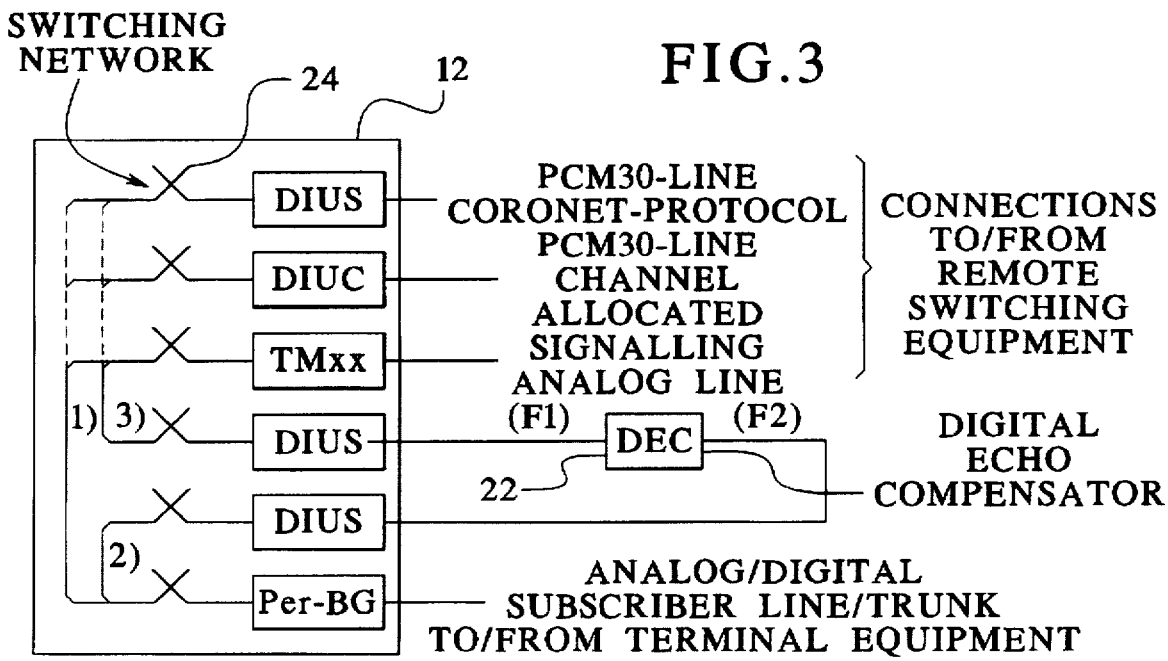

5,784,455

METHOD AND APPARATUS FOR ECHO COMPENSATOR CONNECTION FOR TELEPHONE CONNECTIONS

BACKGROUND OF THE INVENTION

The present invention is directed to a method for echo compensator connection for telephone connections in a telecommunication network that has a plurality of network groups. Each network group has at least one remote or long-distance node and a plurality of subscriber stations that are connected to the remote node via network group lines. The size of the network groups is selected such that echo compensation is not required given the maximum signal running times that occur within a respective network group. The remote nodes of various network groups are connected to one another by long-distance trunks.

Echo compensators that prevent or, respectively, attenuate the echo arising due to the voice terminal equipment or due to the two-wire/four-wire transition are provided in large area (international and intercontinental) communication networks for voice connections beyond a predetermined signal running time that generally amounts to 25 ms. It is not only the running times caused by the length of the transmission path but also the time delays arising due to the digital switching and multiplexing equipment and the subscriber line technology that are to be taken into account in the signal running time under consideration.

In previous public telecommunication networks echo compensators were permanently installed in the long-distance trunks. Since echo compensation is not permitted for digital data transmission, a trunk group splitting also ensues between lines for the voice transmission and lines for the data transmission, so that a maximum of four bundles are required between two long-distance exchanges.

Trunk line splitting is not always possible or economically feasible in private networks because of the lower plurality of lines or channels. Furthermore, it is not expedient to permanently provide echo compensators in the exchanges for private networks since only a low number of exchanges may be required under certain circumstances for the transmission of voice over large distances in private networks.

SUMMARY OF THE INVENTION

It is an object of the present invention to provide a method of the types initially cited with which echo compensation in long-distance connections can also ensue in private networks with minimal technological and economic outlay.

This object is inventively achieved in that an echo compensator is looped into the connection in the respective remote [or: long-distance?] node of the originating network group and of the destination network group during setup of a telephone connection between two network groups. By contrast to prior art solutions, the echo compensators of the present invention are not permanently allocated to the long-distance trunks, but are looped in call-associated fashion as needed into the long-distance connection to be set up.

The routing information for the call setup can thereby be interpreted for the decision as to whether or not an echo compensator is to be looped in. When it is found with reference to the routing information that a telephone connection is to ensue from one network group to another network group, echo compensators are looped into the connection in the exchange of the originating network group and in the exchange of the destination network group.

Since echo compensation is only required for voice transmission, a signal identifying the type of information to be transmitted (voice transmission or data transmission) can also be interpreted, so that the respective echo compensator is only looped in given an intended voice transmission. Trunk line splitting for voice transmission and for data transmission can thus be avoided. The same lines can be employed both for voice transmission as well as for data transmission.

The present invention is also directed to an echo compensator connection, particularly for the implementation of the above-described method. At least one echo compensator is inventively allocated to each remote node. This at least one echo compensator is capable of being optionally looped in between a terminal at the side of the long-distance trunk and a terminal at the side of the network group in the switching equipment of the originating remote node and in the destination remote node upon setup of a telephone connection between subscribers in different network groups.

The plurality of required echo compensators is based on the calculated need or on the need identified in some other way. A plurality of echo compensators is preferably combined to form a multi-channel bundle whose terminal at the network group side and whose terminal at the long-distance trunk side is respectively connectable to a multi-channel terminal of the switching equipment. For example, the echo compensator bundle can have 30 voice transmission channels and be connected to PCM30 terminals of the switching equipment. The decision as to whether or not the echo compensator is connected in is made by the data processing means within the switching equipment. The latter interprets the routing information for setting up the telephone connection and is programmed such that, upon set up of a telephone connection originating at the network group, the subscriber-side terminal is connected via the switching network of the switching equipment to the terminal of the echo compensator at the side of the network group. The terminal of the echo compensator at the side of the long-distance trunk is then connected to the long-distance trunk via the switching matrix of the switching equipment.

The following selection criteria are thus evaluated in the switching equipment. An echo compensator is not looped in given data connections, transit voice connections and voice connections within its own network group. An echo compensator is looped in for outgoing long-distance traffic into an outside network group for voice connections as well as given incoming long-distance traffic from an outside network group for voice connections.

Important advantages of the inventive method for echo compensator connection are that commercially obtainable digital echo compensators can be employed, that no compensator control is required regarding the terminals of the switching equipment connected to the compensator, and that the program of the data processing means of the switching equipment need not be modified. The selection evaluation procedure already used in the switching equipment is employed for the decision as to whether or not an echo compensator is to be looped in or not. Trunk group splitting can be eliminated due to the optional, call-associated connection of an echo compensator. This is of significance especially in private networks that often have only a limited number of lines between two remote nodes.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 is a schematic illustration of a network group with its long-distance trunk terminals and an appertaining echo compensator;

FIG. 3 is a schematic illustration of switching equipment in a remote node for explaining the insertion of the echo compensator.

DESCRIPTION OF THE PREFERRED EMBODIMENTS

Figure 1:
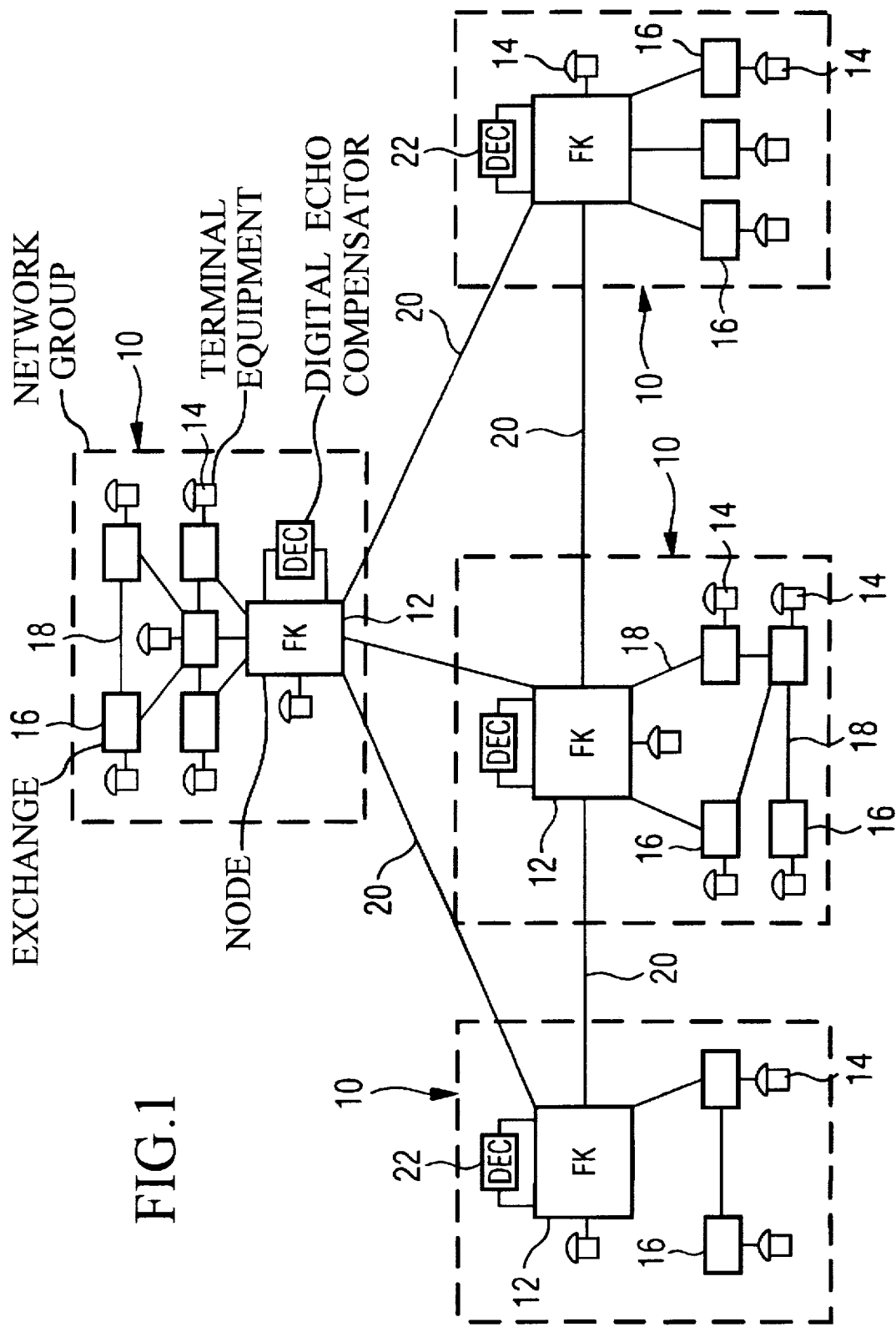
FIG. 1 is a schematic illustration of a telecommunication network having network groups connected to one another via long-distance trunks.

The telecommunication network shown in FIG. 1 has a plurality of network groups 10, each of which is illustrated with a broken-line rectangle. Each network group 10 has at least one remote node 12 having switching equipment to which subscriber stations or terminal equipment 14 and/or further exchanges 16 that are in turn connected to subscriber stations or terminal equipment 14 are connected. The switching equipment can, for example, be systems of the Hicom type of the present assignee. The subscriber stations 14 and the switching equipment 16 are connected to the remote node 12 and/or to one another within the network group 10 by network group lines 18. The size of the network group 10 is dimensioned such that the maximally achieved signal running times, taking the signal processing times into account, remain below the value after which an echo compensation is required. No echo compensators are therefore required for connections within a network group.

The remote nodes 12 of various network groups 10 are connected to one another via long-distance trunks 20, whereby any type of signal transmission link is to be understood to occur by long-distance trunk, regardless of the technology employed. It is assumed that the signal running times for a connection between two terminal equipment of different network groups are so long that echo compensation is required for voice connections between the remote nodes 12 of two different network groups 10. By contrast, echo compensation is not allowed for data transmissions. In order to then be able to use the same long-distance trunks both for voice transmissions as well as for data transmissions without trunk group splitting, at least one echo compensator 22 is allocated to each switching equipment of a remote node 12. This at least one echo compensator 22 is capable of being optionally looped in during the call setup, as shall be explained in greater detail later.

FIG. 3 schematically shows the switching equipment in a remote node 12 having a switching network 24 and a number of terminals that are to be understood only as examples and possibilities here. The following abbreviations have thereby been employed:

DIUS (DIU=digital interface unit) references a digital multi-channel terminal (for example, a 2-Mbit/s terminal) with central channel signalling (Cornet protocol);

DIUC references a digital multi-channel terminal with channel-allocated signalling;

TMxx references an analog terminal for trunks (network group lines, long-distance trunks);

DEC references a digital echo compensator;

F1 references the connection of the echo compensator to a trunk;

F2 references the connection of the echo compensator to the end echo path;

Per-BG references a periphery assembly.

Three switching routes through the switching network are also depicted in FIG. 3, and represent the following connecting paths: 1. Connection without echo compensation; 2. Connection to echo compensator at the side of the terminal equipment; and 3. Connection to echo compensator at the trunk side.

Commercially available digital echo compensators can be employed for the echo compensation, these being connected, for example, to the DIUx assemblies of the switching equipment via 2-Mbit/s lines. Since these echo compensators have 30 channels, they are actually a bundle or pool of echo compensators. As a result, the echo compensators need not be switchable via the 2-Mbit/s terminal. The structural accommodation of the echo compensators can ensue in separate receptacle means or, given an appropriate design, in the housing of the switching equipment as well.

An exchange-oriented signalling (channel-allocated signalling or central channel signalling) between the DIUx terminals and the echo compensator is not required by this. The information sent on the signalling channel (channel-allocated or central channel signalling) is forwarded unmodified to the other side by the echo compensator.

Given pool connection of the echo compensator, a remote control of the echo compensator either via the 2-Mbit/s link or via a DEC operating interface is not required since all 30 channels of the DEC are generally activated. Connections that require no echo compensation are directly interconnected to the desired trunk in the switching network 24.

As may be seen from FIG. 3, the DEC pool can be connected to all occurring subscriber lines and trunks independently of the type of transmission, signalling and monitoring (analog/digital, channel-allocated signalling, central channel signalling, with our without CRC4).

Taking the above-described embodiments into consideration, the functioning of the inventive echo compensator is described below with reference to FIGS. 4,5 and 6. The following rules are thereby to be taken into account. Echo compensators are only looped into voice connections. The discrimination between voice and data connection ensues on the basis of in interpretable identifier, for example in the signalling protocol. Only one echo compensator pair is looped into a long-distance connection side-suited. When no echo compensator is free in the appertaining originating or destination remote node given an incoming or outgoing long-distance connection, then the voice connection must not be set up. Connections within a network group are managed without echo compensation. Tandem exchanges do not loop any echo compensators into a long-distance connection. Echo compensators are looped into long-distance connections regardless of the signal running time between neighboring network groups.

When it is found on the basis of the dial information that the connection is only to be set up within the [same] network group, then this connection is set up in the switching network of the switching equipment without looping in the echo compensator. When, further, it is found on the basis of the signalling that a data transmission is to ensue via the connection to be set up, then an echo compensator is likewise not looped in. The switching network sets up a connection along the path 1 in FIG. 3 between the terminal equipment and the long-distance trunk to be selected.

Figure 4:
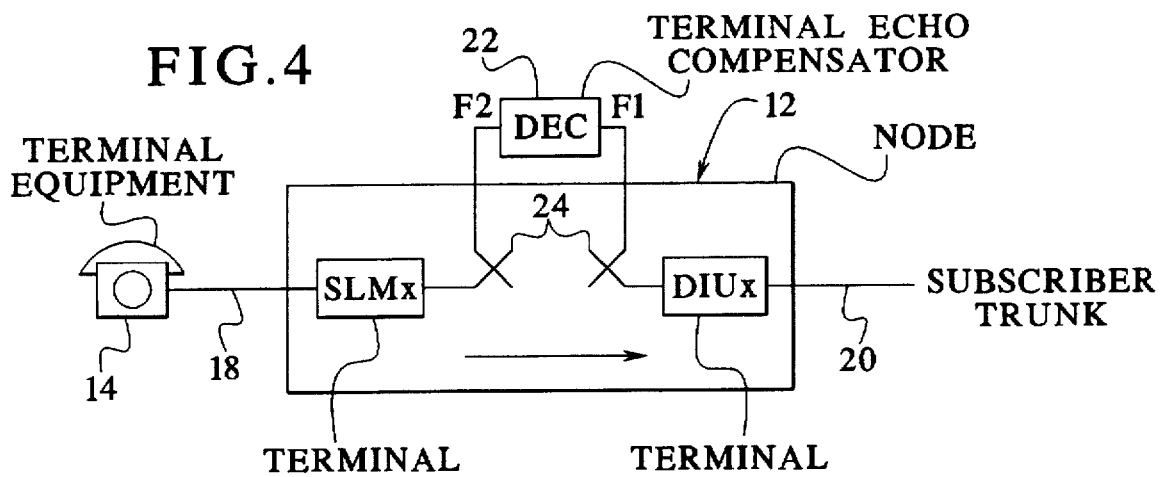
FIGS. 4-6 are respective schematic illustrations of the call setup with echo compensation in the originating switching equipment and in the destination switching equipment.
Figure 5:
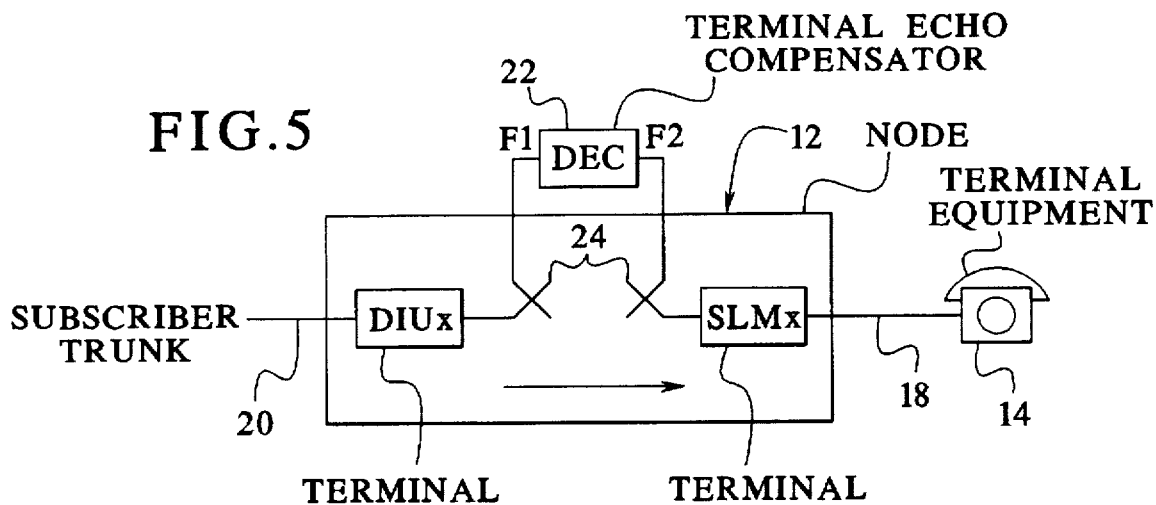
Figure 6:
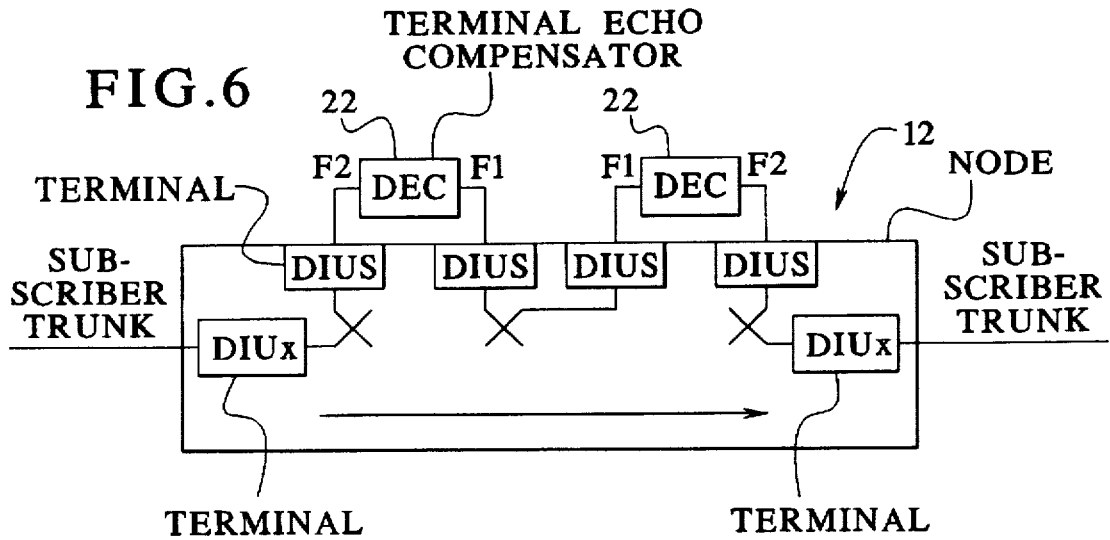

In FIGS. 4 through 6, the arrow indicates the direction of the connection setup. When it is found on the basis of the dial information that a voice connection is to depart its own network group, then the F2 side of the echo compensator bundle is driven in the originating exchange (FIG. 3, path 2; left-hand half in FIG. 4) and the connection is resupplied to the same remote node via the F1 side (FIG. 3, path 3; right-hand half of FIG. 4). The appertaining long-distance trunk is then selected by the dial interpretation that ensues anew. When no echo compensator is free in the originating remote node, then the connection must not be set up.

Given voice connections, the F1 side of the echo compensator pool 22 is driven in the destination remote node and the connection is resupplied to the remote node via the F2 side (FIG. 3, path 3 and path 2; FIG. 5). The appertaining network group line and the subscriber directly connected to the remote node are then selected by the dial interpretation that ensues anew. When no echo compensator is free in the incoming remote node, then the connection must not be set up.

When further remote nodes are traversed during the course of a connection setup (transit traffic, FIG. 6), then looping echo compensators in is suppressed in these transit remote nodes. The two long-distance lines are directly connected to one another via the switching network.

As was already mentioned above, echo compensation is not allowed in data transmission. When a switch from voice transmission to data transmission is made in the connection that has been set up, then the useful channel connection via the echo compensator 22 is disconnected by a command transmitted in the signalling protocol (cleardown of the connections 2 and 3 in FIG. 3), and the line input is subsequently directly interconnected to the line output (connection 1 in FIG. 3). A control of the echo compensator via the 2-Mbit/s terminals is superfluous as a result of this measure.

It can be required given certain network configurations (i.e. correspondingly long signal running times between subscribers A and B) that the echo compensator connection must ensue in the same remote node both for the A-subscriber as well as for the B-subscriber. As already set forth above, two echo compensators can be interconnected to form a pair via the switching network of the switching equipment (FIG. 6).

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

We claim:

1. A method for echo compensator connection for telephone connections in a telecommunication network having a plurality of network groups, each of said network groups having at least one remote node and having a plurality of subscriber stations that are connected to the remote node via network group lines, comprising the steps of:

configuring each network group of the plurality of network groups such that maximum signal running times occurring within a respective network group require no echo compensation, remote nodes of various network groups of the plurality of network groups being connected to one another by long-distance trunks; and looping echo compensators between remote nodes of an originating network group of the plurality of network groups and remote nodes of a destination network group of the plurality of network groups given a call setup of a telephone connection between originating and destination network groups.

2. The method according to claim 1, wherein routing information for the call setup is interpreted for a decision as to whether or not an echo compensator is to be looped in.

3. The method according to claim 2, wherein a signal identifying type of information to be transmitted is interpreted for the decision as to whether or not an echo compensator is to be looped in.

4. An apparatus for echo compensator connection for telephone connections in a telecommunication network, comprising:

a plurality of network groups, each of said network groups having at least one remote node and a plurality of subscriber stations that are connected to the remote node via network group lines, each network group being configured such that maximum signal running times occurring within a respective network group of the plurality of network groups require no echo compensation, the remote nodes of various network groups of the plurality of network nodes being connected to one another by long-distance trunks;

at least one echo compensator respectively allocated to each remote node of the remote nodes of the network groups; and device for looping echo compensators between a terminal of a respective long-distance trunk and a terminal of a respective network group in switching equipment of an originating remote node and of a destination remote node upon call setup of a telephone connection between subscribers in different network groups.

5. The apparatus according to claim 4, wherein a plurality of echo compensators are combined to form a multi-channel bundle having a terminal at a network group side and having a terminal at a long-distance trunk side that is respectively connectable to the switching equipment via a multi-channel terminal.

6. The apparatus according to claim 4, wherein a respective remote node of the remote nodes of the network groups has an exchange with a data processor, and wherein a data processor in the exchange of the remote node is programmed such that the data processor interprets routing information; and wherein a looping-in of the echo compensator occurs as a function of the interpretation of the routing information.

7. A method for echo compensator connection for telephone connections in a telecommunication network having a plurality of network groups, each of said network groups having at least one remote node and having a plurality of subscriber stations that are connected to the remote node via network group lines, comprising the steps of:

configuring each network group of the plurality of network groups such that maximum signal running times occurring within a respective network group require no echo compensation, remote nodes of various network groups of the plurality of network groups being connected to one another by long-distance trucks;

interpreting routing information for a call setup of a telephone connection between an originating network group and a destination network group to determine if an echo compensator is to be looped in; and looping echo compensators between a remote node of the originating network group of the plurality of network groups and remote nodes of a destination network group of the plurality of network groups given a determination that an echo compensator is to be looped in.

8. The method according to claim 7, wherein a signal identifying type of information to be transmitted is interpreted for the decision as to whether or not an echo compensator is to be looped in.

* * * * *